US012812618B2

(12) United States Patent
Hahn et al.

(10) Patent No.: US 12,812,618 B2
(45) Date of Patent: Nov. 24, 2026

(54) METHOD AND DEVICE FOR TRANSMITTING AND RECEIVING SIGNALS IN COMMUNICATION SYSTEM

(71) Applicants: HYUNDAI MOTOR COMPANY, Seoul (KR); KIA CORPORATION, Seoul (KR); SEOUL NATIONAL UNIVERSITY R&DB FOUNDATION, Seoul (KR)

(72) Inventors: Gene Back Hahn, Hwaseong-si (KR); Young Kil Suh, Hwaseong-si (KR); Ui Hyun Hong, Hwaseong-si (KR); Bum Jun Kim, Seoul (KR); Jeonghyeon Kwon, Seoul (KR); Wan Choi, Seoul (KR)

(73) Assignees: Hyundai Motor Company, Seoul (KR); Kia Corporation, Seoul (KR); Seoul National University R&DB Foundation, Seoul (KR)

( * ) Notice: Subject to any disclaimer, the term of this patent is extended or adjusted under 35 U.S.C. 154(b) by 364 days.

(21) Appl. No.: 18/598,447

(22) Filed: Mar. 7, 2024

(65) Prior Publication Data

US 2024/0215005 A1 Jun. 27, 2024

Related U.S. Application Data

(63) Continuation of application No. PCT/KR2022/013555, filed on Sep. 8, 2022.

(30) Foreign Application Priority Data

Sep. 9, 2021 (KR) ........................ 10-2021-0120596

(51) Int. Cl.
*H04W 72/0453* (2023.01)
*H04W 24/10* (2009.01)

(52) U.S. Cl.
CPC ....... *H04W 72/0453* (2013.01); *H04W 24/10* (2013.01)

(58) Field of Classification Search
CPC . H04W 72/0453; H04W 24/10; H04W 72/04; H04W 72/23; H04W 72/535; H04W 72/542; H04W 72/543
See application file for complete search history.

(56) References Cited

U.S. PATENT DOCUMENTS 8,290,503 B2 10/2012 Sadek et al.
8,532,605 B2 9/2013 Bienas et al.
(Continued)

FOREIGN PATENT DOCUMENTS

KR 10-1035804 B1 5/2011
KR 10-1314709 B1 10/2013
KR 10-2021-0042095 A 4/2021

OTHER PUBLICATIONS

Dominique Noguet, "Sensing techniques for Cognitive Radio—State of the art and trends—A White Paper," CEA-LETI, France, Apr. 15, 2009.
(Continued)

*Primary Examiner* — Shawn D Miller
(74) *Attorney, Agent, or Firm* — Morgan Lewis & Bockius LLP

(57) ABSTRACT

An operation method of a first communication node in a communication system may include the steps of: transmitting to a second communication node a first sensing signal through a plurality of reference frequencies included in a first reference frequency set that is set within a first sensing frequency band for a first sensing procedure; receiving a first feedback signal from the second communication node that has received the first sensing signal; identifying information on a first frequency band selected from among a plurality of split frequency bands included in the first sensing frequency
(Continued)

band, on the basis of the first feedback signal; and triggering a second sensing procedure in a second sensing frequency band that is determined on the basis of the identified first frequency band.

20 Claims, 7 Drawing Sheets

(56) References Cited

U.S. PATENT DOCUMENTS

| | | | |
|---|---|---|---|
| 11,064,549 B2 | 7/2021 | Ang et al. | |
| 2008/0225789 A1 | 9/2008 | Kim et al. | |
| 2018/0167954 A1 | 6/2018 | Wakabayashi | |
| 2019/0379510 A1 | 12/2019 | Gupta et al. | |
| 2020/0314607 A1 | 10/2020 | Hwang et al. | |
| 2022/0159426 A1* | 5/2022 | Du | H04L 1/00 |
| 2022/0248374 A1* | 8/2022 | Uziel | H04W 74/0808 |

OTHER PUBLICATIONS

International Search Report dated Dec. 14, 2022 cited in International Patent Application No. PCT/KR2022/013555 (w/English translation).

"3rd Generation Partnership Project; Technical Specification Group Radio Access Network; NR; Base Station (BS) radio transmission and reception" 3GPP TS 38.104, V17.2.0, Jun. 2021.

* cited by examiner

【FIG. 1】
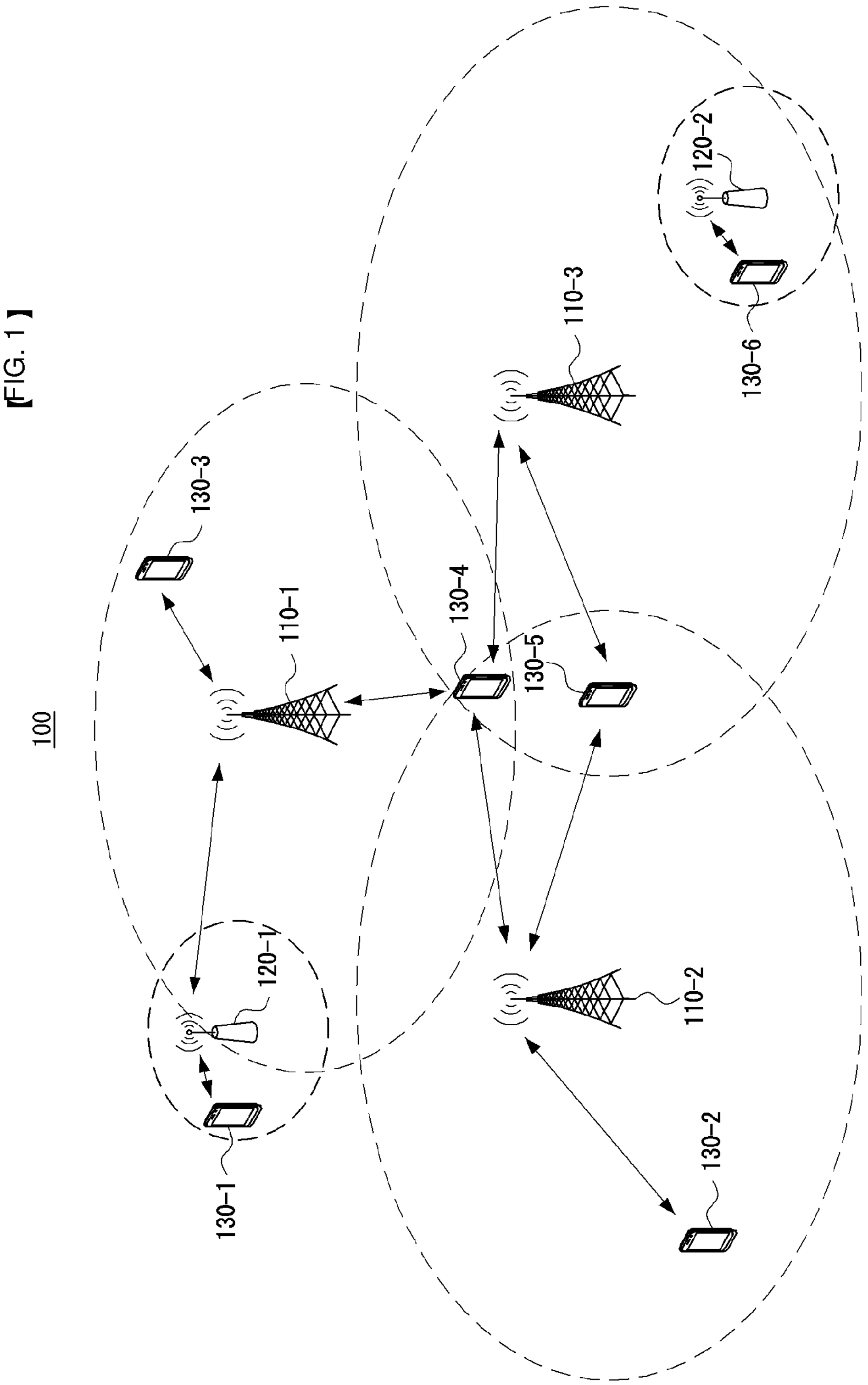

【FIG. 2】
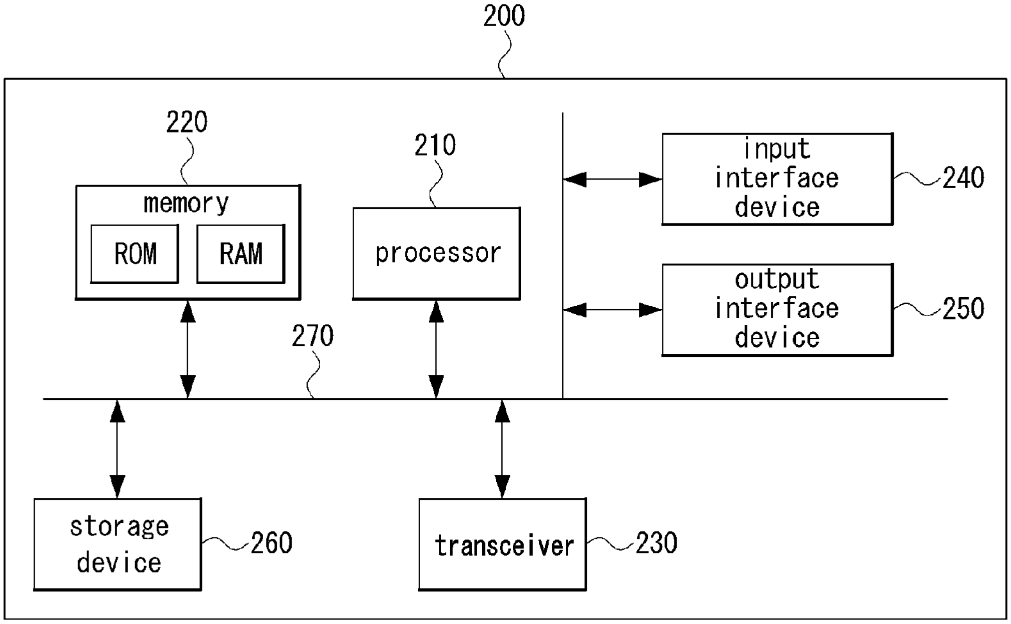
【FIG. 3】
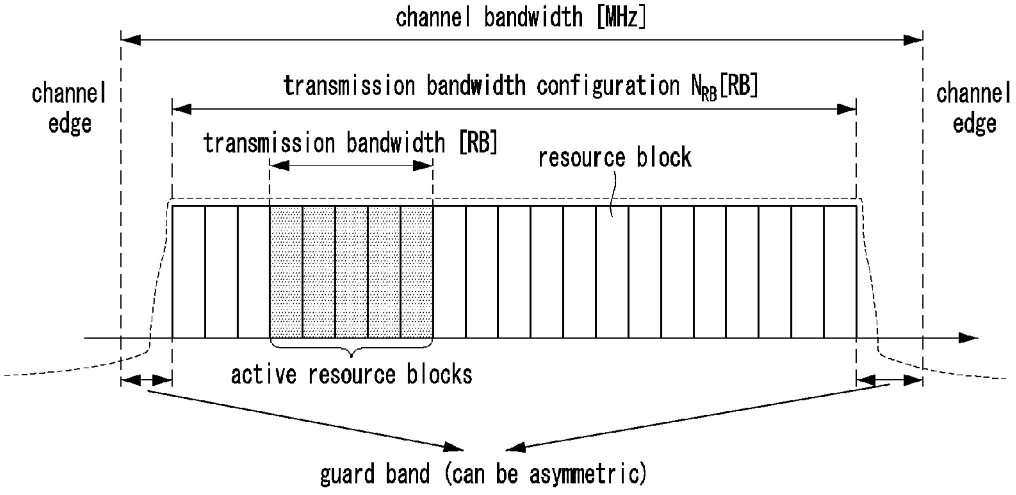

【FIG. 4】
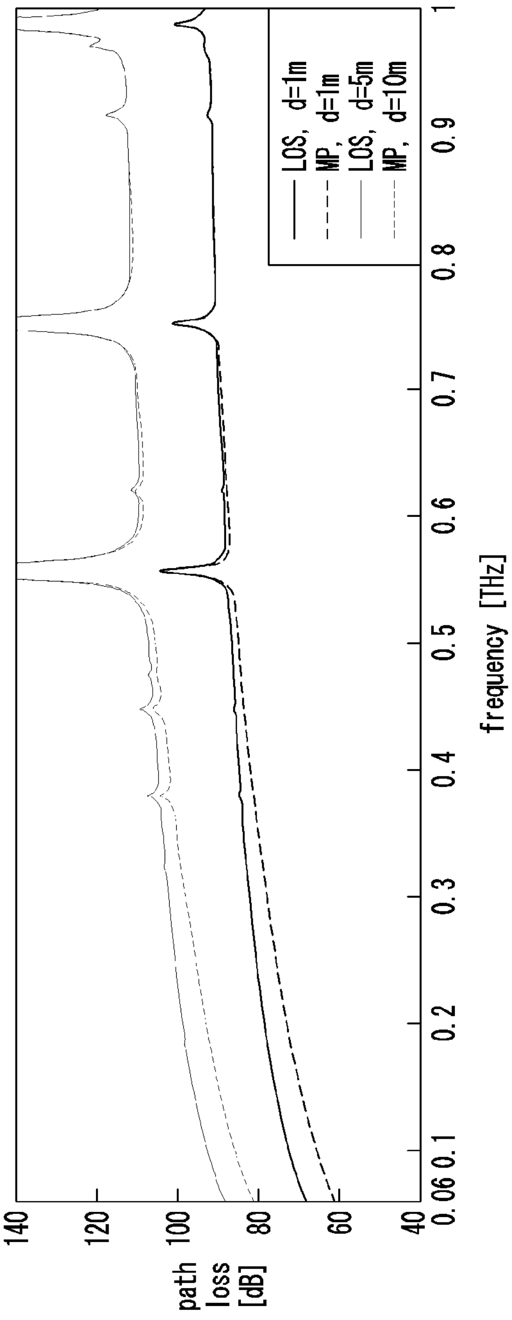

【FIG. 5】
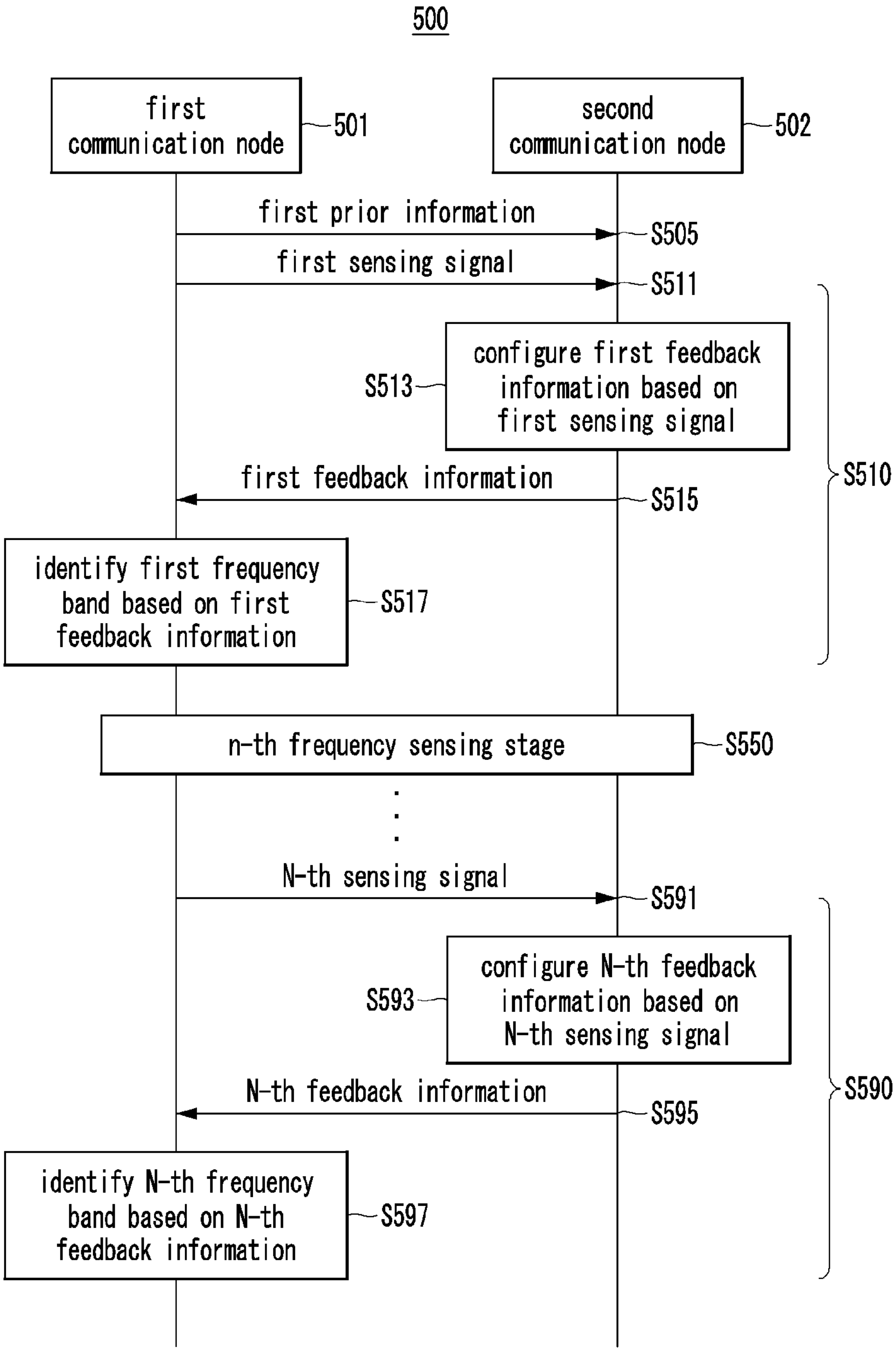

【FIG. 6】
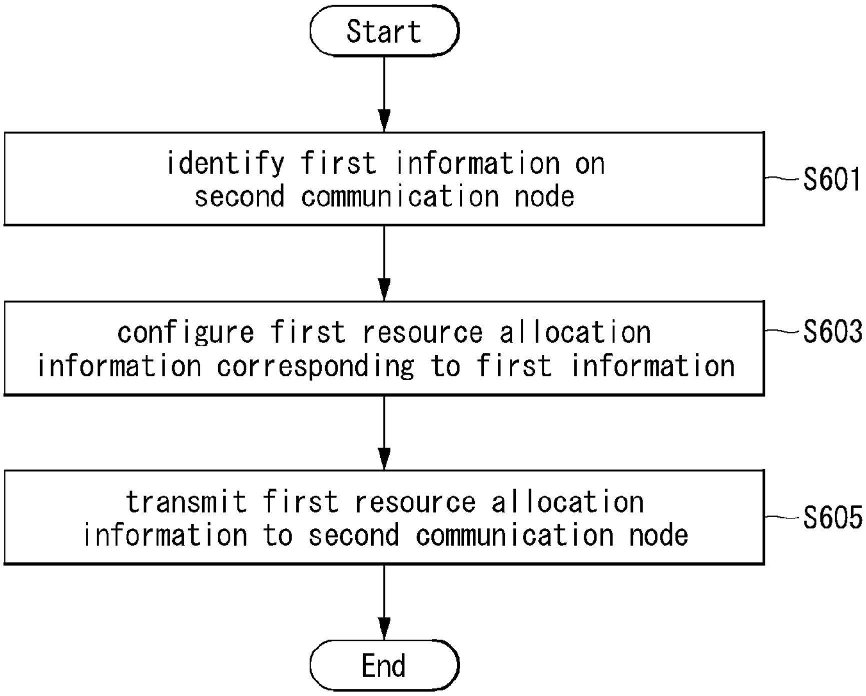

【FIG. 7】
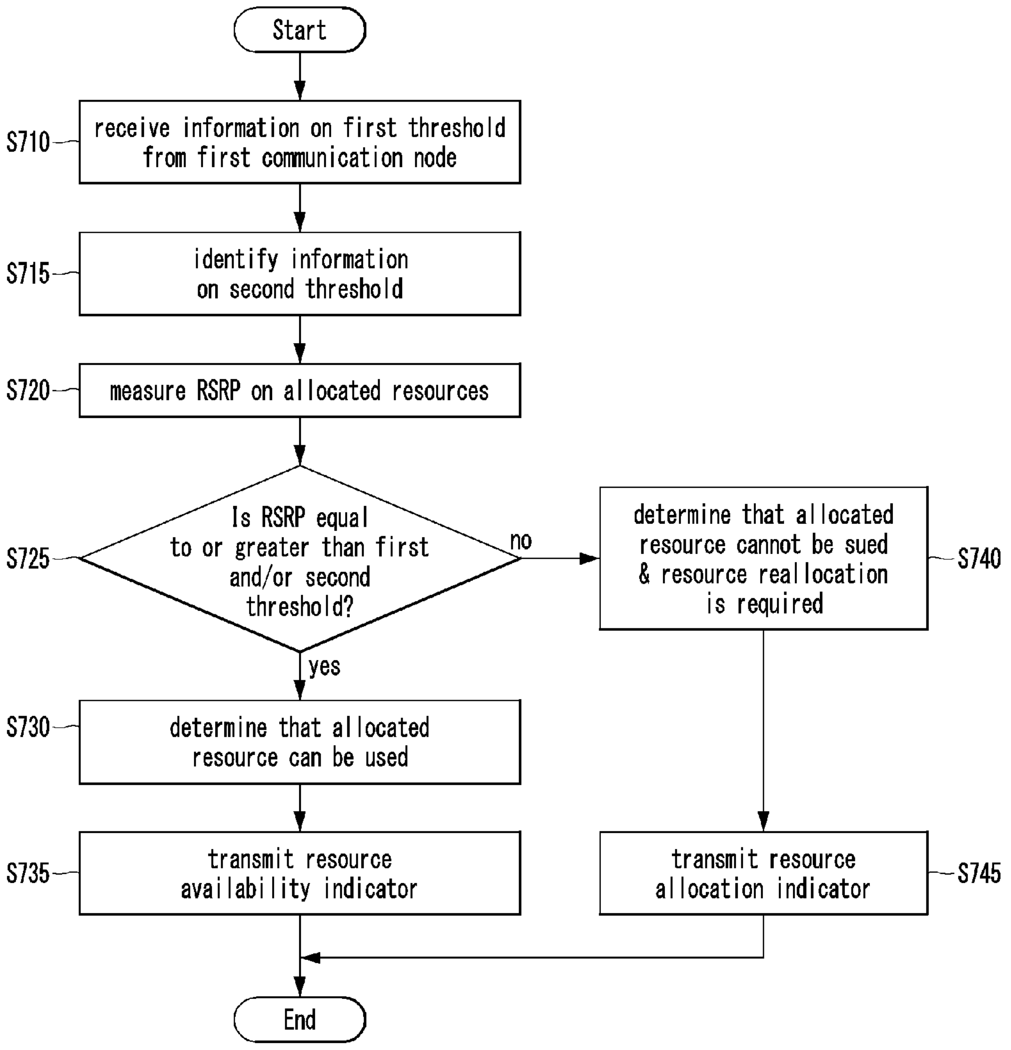

【FIG. 8】
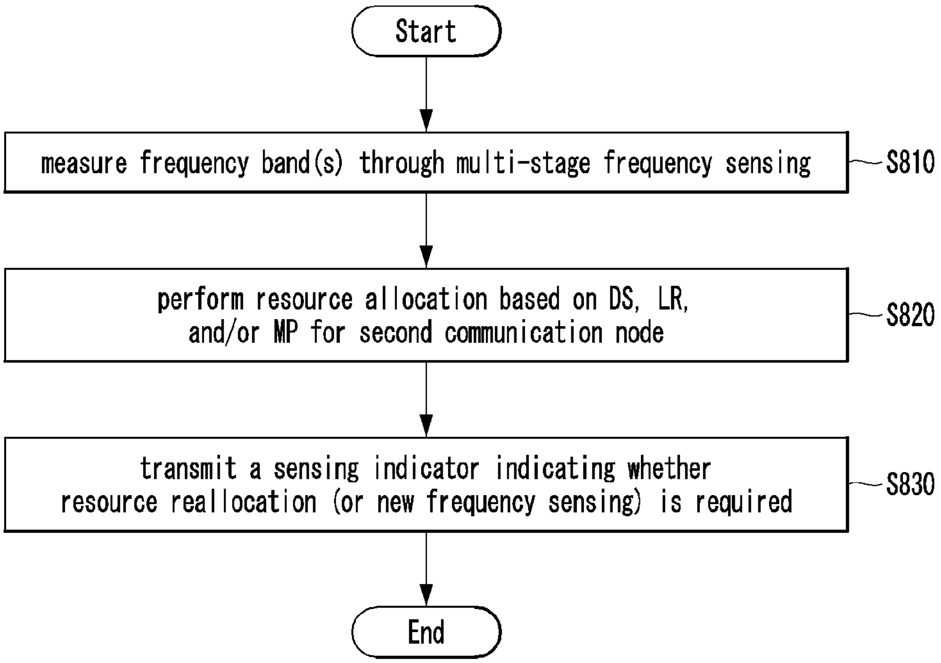

METHOD AND DEVICE FOR TRANSMITTING AND RECEIVING SIGNALS IN COMMUNICATION SYSTEM

CROSS-REFERENCE TO RELATED APPLICATIONS

This application is a bypass continuation application of PCT/KR2022/013555 filed Sep. 8, 2022, which claims priority to Korean Patent Application No. KR2021-0120596 filed Sep. 9, 2021 in the Korean Intellectual Property Office. The disclosures of PCT/KR2022/013555 and KR2021-0120596 are incorporated herein by reference in their entirety.

TECHNICAL FIELD

The present disclosure relates to a signal transmission and reception technique in a communication system, and more particularly, to a technique for transmitting and receiving signals for frequency band sensing and radio resource allocation, which improves communication performance in a high frequency band.

BACKGROUND ART

With the development of information and communication technology, various wireless communication technologies have been developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

In order to process rapidly increasing wireless data, the 5G NR communication or subsequent wireless communication technologies can support communication in relatively high frequency bands. For example, radio frequency bands used for wireless communication may be broadly classified into frequency range 1 (FR1) bands and frequency range 2 (FR2) bands. Here, the FR1 bands may refer to relatively low frequency bands of about 7 GHz or below. The FR2 bands may refer to relatively high frequency bands of about 7 GHz or above. The FR2 bands may include 28-29 GHz bands, unlicensed bands, millimeter wave bands, and terahertz wave bands. In an exemplary embodiment of the communication system, the FR1 bands and FR2 bands may be defined as in Table 1.

In the FR2 band, which is a relatively high frequency band, channel estimation may take a long time compared to the FR1 band, and a channel and path loss may change to a high level over time. Techniques for efficiently utilizing the FR2 band according to its characteristics and communication environments are required.

Meanwhile, the technologies that are the background of the present disclosure are written to improve the understanding of the background of the present disclosure and may include content that is not already known to those of ordinary skill in the art to which the present disclosure belongs.

SUMMARY

The present disclosure is directed to providing a method and an apparatus for transmitting and receiving signals supporting a multi-stage frequency sensing procedure and a frequency allocation operation for quick channel estimation and efficient resource allocation within an available frequency band.

An operation method of a first communication node, according to an exemplary embodiment of the present disclosure for achieving the above-described objective, may include: triggering a first sensing procedure in a first sensing frequency band; transmitting to a second communication node a first sensing signal at a plurality of reference frequencies included in a first reference frequency set configured within the first sensing frequency band; receiving, from the second communication node receiving the first sensing signal, a first feedback signal generated based on a result of receiving the first sensing signal; identifying information on a first frequency band selected from among a plurality of divided frequency bands included in the first sensing frequency band, based on the first feedback signal; and triggering a second sensing procedure in a second sensing frequency band determined based on the identified first frequency band. The plurality of reference frequencies included in the first reference frequency set may correspond to the plurality of divided frequency bands included in the first sensing frequency band, respectively.

The triggering of the first sensing procedure may include: transmitting first prior information to be used in the first sensing procedure to the second communication node, and the first prior information may include at least part of information on the plurality of divided frequency bands included in the first sensing frequency band or information on the plurality of reference frequencies included in the first reference frequency set.

The identifying of the information on the first frequency band may include: identifying measurement results included in the first feedback signal and measured by the second communication node with respect to the first sensing signal at at least part of the plurality of reference frequencies included in the first reference frequency set; identifying a first frequency corresponding to a best measurement result among the measurement results for the first sensing signal; and identifying the first frequency band corresponding to the first frequency.

The identifying of the information on the first frequency band may include: identifying information on a first frequency selected by the second communication node from among the plurality of reference frequencies included in the first reference frequency set based on a result of receiving the first sensing signal, which is included in the first feedback signal; and identifying the first frequency band corresponding to the first frequency.

The operation method may further include, after triggering the second sensing procedure, identifying first information on the second communication node in a second frequency band selected based on the second sensing procedure; configuring first resource allocation information for the second communication node based on the first information on the second communication node; and transmitting the first resource allocation information to the second communication node.

The first information may include at least one of information on a Doppler shift (DS) for the second communication node, information on a latency requirement (LR) for the second communication node, or information on a maximum power of the second communication node, and the first resource allocation information may include at least one of information on a size of a frequency band allocated to the second communication node within the second frequency band, or information on a reference allocation frequency corresponding to a location of the allocated frequency band.

The operation method may further include: after transmitting the first resource allocation information to the second communication node, receiving a sensing indicator configured based on the first resource allocation information; and determining whether an additional sensing procedure is required for the second communication node, based on the received sensing indicator.

The receiving of the sensing indicator may include: receiving a Channel State Information (CSI) report signal transmitted from the second communication node to the first communication node; and identifying information on the sensing indicator included in the CSI report signal, wherein the sensing indicator is determined based on a result of comparing first reception strength information measured by the second communication node in an allocated resource indicated by the first resource allocation information with at least one of a first threshold transmitted from the first communication node to the second communication node or a second threshold set by the second communication node.

An operation method of a first communication node, according to an exemplary embodiment of the present disclosure for achieving the above-described objective, may comprise: performing a frequency band sensing procedure including one or more sensing procedures through signal transmission and reception with a second communication node within a first sensing frequency band; identifying information on one or more divided frequency bands selected as a result of the frequency band sensing procedure; identifying first information on the second communication node in the selected one or more divided frequency bands; configuring first resource allocation information, which is resource allocation information for the second communication node in the selected one or more divided frequency bands, based on the first information on the second communication node; and transmitting the first resource allocation information to the second communication node.

The first information may include at least one of information on a Doppler shift (DS) for the second communication node, information on a latency requirement (LR) for the second communication node, or information on a maximum power of the second communication node, and the first resource allocation information may include at least one of information on a size of a frequency band allocated to the second communication node within the second frequency band, or information on a reference allocation frequency corresponding to a location of the allocated frequency band.

The performing of the frequency band sensing procedure may include: triggering a first sensing procedure in a first sensing frequency band; transmitting a first sensing signal at a plurality of reference frequencies included in a first reference frequency set configured within the first sensing frequency band; receiving, from the second communication node receiving the first sensing signal, a first feedback signal generated based on a result of receiving the first sensing signal; identifying information on a first frequency band selected from among a plurality of divided frequency bands included in the first sensing frequency band, based on the first feedback signal; triggering a second sensing procedure in a second sensing frequency band determined based on the identified first frequency band; and selecting the one or more divided frequency bands as a result of the second sensing procedure, wherein the plurality of reference frequencies included in the first reference frequency set correspond to the plurality of divided frequency bands included in the first sensing frequency band, respectively.

The identifying of the first information on the second communication node may include: transmitting a first request signal to the second communication node in the selected one or more divided frequency bands; receiving, from the second communication node, a first response signal transmitted as a response to the first request signal in the selected one or more divided frequency bands; and identifying the first information included in the first response signal.

The operation method may further include: after transmitting the first resource allocation information to the second communication node, receiving a sensing indicator configured based on the first resource allocation information; and determining whether an additional sensing procedure is required for the second communication node, based on the received sensing indicator, wherein the sensing indicator is determined based on a result of comparing first reception strength information measured by the second communication node in an allocated resource indicated by the first resource allocation information with at least one of a first threshold transmitted from the first communication node to the second communication node or a second threshold set by the second communication node.

A first communication node, according to an exemplary embodiment of the present disclosure for achieving the above-described objective, may include a processor, and the processor may be configured to perform: receiving a first sensing signal from a second communication node at at least part of a plurality of reference frequencies included in a first reference frequency set configured for a first sensing procedure within a first sensing frequency band; generating a first feedback signal based on a result of receiving the first sensing signal; transmitting the first feedback signal to the second communication node transmitting the first sensing signal; and receiving a second sensing signal at at least part of a plurality of reference frequencies included in a second reference frequency set configured for a second sensing procedure within a second frequency band determined based on a first frequency band selected through the first sensing procedure, wherein the plurality of reference frequencies included in the first reference frequency set correspond to a plurality of divided frequency bands included in the first sensing frequency band, respectively, and the first sensing frequency band is selected based on the first feedback signal from among the plurality of divided frequency bands included in the first sensing frequency band.

The processor may be further configured to perform: before receiving the first sensing signal, receiving from the second communication node first prior information to be used in the first sensing procedure, and the first prior information may include at least part of information on the plurality of divided frequency bands included in the first sensing frequency band or information on the plurality of reference frequencies included in the first reference frequency set.

In the generating of the first feedback signal, the processor may be further configured to perform: identifying measurement results measured by the first communication node with respect to the first sensing signal at at least part of the plurality of reference frequencies included in the first reference frequency set; and generating the first feedback signal including the measurement results measured with respect to the first sensing signal.

In the generating of the first feedback signal, the processor may be further configured to perform: identifying measurement results measured by the first communication node with respect to the first sensing signal at at least part of the plurality of reference frequencies included in the first reference frequency set; identifying a first frequency corresponding to a best measurement result among the measurement results for the first sensing signal; and generating the first feedback signal based on information on the first frequency.

The processor may be further configured to perform: after receiving the second sensing signal, transmitting first information on the first communication node to the second communication node in a second frequency band selected based on the second sensing procedure; and receiving first resource allocation information configured based on the first information from the second communication node.

The processor may be further configured to perform: after receiving the first resource allocation information, measuring first reception strength information in an allocated resource indicated by the first resource allocation information; configuring a sensing indicator based on a result of comparing the measured first reception strength information with at least one of a first threshold transmitted from the first communication node to the second communication node and a second threshold information set by the second communication node; and transmitting the sensing indicator to the second communication node.

The sensing indicator may be transmitted as being included in a Channel State Information (CSI) report signal transmitted from the first communication node to the second communication node.

According to the method and apparatus for transmitting and receiving signals in the communication system, communication nodes such as a base station and a terminal can quickly and efficiently estimate a frequency appropriate for mutual communication within an available frequency band based on the multi-stage frequency sensing procedure. The communication nodes such as a base station and a terminal can perform the resource allocation procedure based on specific information identified with respect to the terminal, etc., within a frequency band determined based on the multi-stage frequency sensing procedure. This can improve communication performance in a high frequency band such as an FR2 band and terahertz band.

BRIEF DESCRIPTION OF DRAWINGS

FIG. 1 is a conceptual diagram illustrating an exemplary embodiment of a communication system.

FIG. 2 is a block diagram illustrating an exemplary embodiment of a communication node constituting a communication system.

FIG. 3 is a conceptual diagram illustrating an exemplary embodiment of a channel bandwidth in a communication system.

FIG. 4 is a graph illustrating an exemplary embodiment of path loss measurement results in a communication system.

FIG. 5 is a sequence chart illustrating an exemplary embodiment of a frequency sensing method in a communication system.

FIG. 6 is a flowchart illustrating an exemplary embodiment of a resource allocation method in a communication system.

FIG. 7 is a flowchart illustrating an exemplary embodiment of a method for determining whether to reallocate resources in a communication system.

FIG. 8 is a flowchart illustrating an exemplary embodiment of a signal transmission and reception method in a communication system.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/of" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, B5G mobile communication network (6G communication network, etc.), or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

As shown in FIG. 1, a communication system 100 may include a plurality of communication nodes 110-1, 110-2, 110-3, 120-1, 120-2, 130-1, 130-2, 130-3, 130-4, 130-5, and 130-6. Also, the communication system 100 may further include a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110-1, 110-2, 110-3, 120-1, 120-2, 130-1, 130-2, 130-3, 130-4, 130-5, and 130-6 may support communication protocols defined in the 3rd generation partnership project (3GPP) technical specifications (e.g., LTE communication protocol, LTE-A communication protocol, NR communication protocol, or the like). The plurality of communication nodes 110-1, 110-2, 110-3, 120-1, 120-2, 130-1, 130-2, 130-3, 130-4, 130-5, and 130-6 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

FIG. 2 is a block diagram illustrating an exemplary embodiment of a communication node constituting a communication system.

As shown in FIG. 2, an apparatus 200 may comprise at least one processor 210, a memory 220, and a transceiver 230 connected to the network for performing communications. Also, the apparatus 200 may further comprise an input interface device 240, an output interface device 250, a storage device 260, and the like. The respective components included in the apparatus 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor through which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g. single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to operations of the plurality of base stations 110-1, 110-2, 110-3, 120-1, and 120-2, operations supported by the plurality of base stations 110-1, 110-2, 110-3, 120-1, and 120-2, or the like. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, signal transmission and reception methods in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In order to process rapidly increasing wireless data, the 5G NR communication or subsequent wireless communication technologies can support communication in relatively high frequency bands. For example, radio frequency bands used for wireless communication may be broadly classified into frequency range 1 (FR1) bands and frequency range 2 (FR2) bands. Here, the FR1 bands may refer to relatively low frequency bands of about 7 GHz or below. The FR2 bands may refer to relatively high frequency bands of about 7 GHz or above. The FR2 bands may include 28-29 GHz bands, unlicensed bands, millimeter wave bands, and terahertz wave bands. In an exemplary embodiment of the communication system, the FR1 bands and FR2 bands may be defined as in Table 1.

TABLE 1

| Frequency Range (FR) | Corresponding frequency range |
|---|---|
| FR1 | 410 MHz~7125 MHz |
| FR2 | 24250 MHz~52600 MHz |

In an exemplary embodiment of the communication system, conditions or requirements for radio communication may be defined identically or differently for the FR1 band and FR2 band. Operating bands in which communication nodes can communicate in the FR1 band may be defined as shown in Tables 2 and 3.

TABLE 2

| NR operating band | Uplink (UL) operating band BS receive/UE transmit $F_{UL,low}$-$F_{UL,high}$ | Downlink (DL) operating band BS transmit/UE receive $F_{DL,low}$-$F_{DL,high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n24[7] | 1626.5 MHz-1660.5 MHz | 1525 MHz-1559 MHz | FDD |

TABLE 2-continued

| NR operating band | Uplink (UL) operating band BS receive/UE transmit $F_{UL,low}$-$F_{UL,high}$ | Downlink (DL) operating band BS transmit/UE receive $F_{DL,low}$-$F_{DL,high}$ | Duplex mode |
|---|---|---|---|
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD[3] |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n53 | 2483.5 MHz-2495 MHz | 2483.5 MHz-2495 MHz | TDD |

TABLE 3

| NR operating band | Uplink (UL) operating band BS receive/UE transmit $F_{UL,low}$-$F_{UL,high}$ | Downlink (DL) operating band BS transmit/UE receive $F_{DL,low}$-$F_{DL,high}$ | Duplex mode |
|---|---|---|---|
| n65 | 1920 MHz-2010 MHz | 2110 MHz-2200 MHz | FDD |
| n66 | 1710 MHz-1780 MHz | 2110 MHz-2200 MHz | FDD |
| n67 | N/A | 738 MHz-758 MHz | SDL |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n85 | 698 MHz-716 MHz | 728 MHz-746 MHz | FDD |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD[2] |
| n92 | 832 MHz-862 MHz | 1432 MHz-1517 MHz | FDD[2] |
| n93 | 880 MHz-915 MHz | 1427 MHz-1432 MHz | FDD[2] |
| n94 | 880 MHz-915 MHz | 1432 MHz-1517 MHz | FDD[2] |
| n95[1] | 2010 MHz-2025 MHz | N/A | SUL |
| n96[4] | 5925 MHz-7125 MHz | 5925 MHz-7125 MHz | TDD[3] |
| n97[5] | 2300 MHz-2400 MHz | N/A | SUL |
| n98[5] | 1880 MHz-1920 MHz | N/A | SUL |
| n99[6] | 1626.5 MHz-1660.5 MHz | N/A | SUL |

Meanwhile, operating bands in which communication nodes can communicate in the FR2 band may be defined as shown in Table 4.

TABLE 4

| NR operating band | Uplink (UL) and Downlink (DL) operating band BS transmit/receive UE transmit/receive $F_{UL,low}$-$F_{UL,high}$ $F_{DL,low}$-$F_{DL,high}$ | Duplex mode |
|---|---|---|
| n257 | 26500 MHz-29500 MHz | TDD |
| n258 | 24250 MHz-27500 MHz | TDD |
| n259 | 39500 MHz-43500 MHz | TDD |
| n260 | 37000 MHz-40000 MHz | TDD |

TABLE 4-continued

| NR operating band | Uplink (UL) and Downlink (DL) operating band BS transmit/receive UE transmit/receive $F_{UL,low}$-$F_{UL,high}$ $F_{DL,low}$-$F_{DL,high}$ | Duplex mode |
|---|---|---|
| n261 | 27500 MHz-28350 MHz | TDD |
| n262 | 47200 MHz-48200 MHz | TDD |

Referring to Tables 2 to 4, in an exemplary embodiment of the communication system, among all frequency bands, operating bands such as n1 to n99 may be defined in the FR1 band, and operating bands such as n257 to n262 may be defined in the FR2 band. In other words, the operating bands of the FR1 band and the operating bands of the FR2 band may be defined separately. For each operating band, a frequency band, duplexing mode (or multiplexing mode), subcarrier spacing (SCS), channel bandwidth, and/or the like may be set differently.

FIG. 3 is a conceptual diagram illustrating an exemplary embodiment of a channel bandwidth in a communication system.

As shown in FIG. 3, in an exemplary embodiment of the communication system, a first channel may be configured with one or more channel bandwidths. Here, the first channel may be a base station (BS) channel. The channel bandwidth shown in FIG. 3 may be a BS channel bandwidth (or BS bandwidth). The BS channel bandwidth may support one or more radio frequency (RF) carriers for downlink transmission or uplink reception of a base station. On the other hand, one or more UE channel bandwidths (or UE bandwidths) for communication between one or more UEs (or terminals) connected to the base station and the base station may be configured. The UE channel bandwidth for each UE may be configured statically or dynamically within a spectrum of the BS channel bandwidth for the BS to which the UE is connected. In other words, one or more UE bandwidths (or UE bandwidth parts) each including resource blocks less than or equal to resource blocks constituting the RF carrier of the BS channel bandwidth may be configured within the BS channel bandwidth. Each UE may perform uplink or downlink communication with the base station through one or more UE bandwidths (or UE bandwidth parts) configured for the UE.

In an exemplary embodiment of the communication system, one or more channel bandwidths may be separated by channel edges in the frequency domain. Each channel bandwidth may be composed of a first guard band, a transmission bandwidth configuration, a second guard band, and the like. Within one channel bandwidth, the first and second guard bands may be configured symmetrically or asymmetrically. In other words, within one channel bandwidth, the first and second guard bands may have the same or different sizes.

The transmission bandwidth configuration may be arranged between the first and second guard bands. The transmission bandwidth configuration may refer to a set of resource blocks that can be used for transmission and reception within the channel bandwidth. The transmission bandwidth configuration may be composed of $N_{RB}$ resource blocks (RB). $N_{RB}$ may be a natural number greater than or equal to 1. The transmission bandwidth configuration may include a transmission bandwidth including one or more active RBs. Information or signals may be transmitted and received through one or more active RBs constituting one or more transmission bandwidths. A value of $N_{RB}$, the size of the transmission bandwidth configuration, may be determined according to the size of the BS channel bandwidth (MHz) and the size of the SCS (kHz). Table 5 and Table 6 show an example of values of $N_{RB}$, the size of the transmission bandwidth configuration in the FR1 band and FR2 band, respectively.

TABLE 5

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

TABLE 6

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N/A |
| 120 | 32 | 66 | 132 | 264 |

In an exemplary embodiment of the communication system, conditions or requirements for transmission and reception of the base station or UE may be defined based on the transmission bandwidth configuration determined based on Table 5 or Table 6.

FIG. 4 is a graph illustrating an exemplary embodiment of path loss measurement results in a communication system.

As shown in FIG. 4, in an exemplary embodiment of the communication system, as a frequency band used for wireless communication becomes higher, the amount of path loss that occurs may increase. In a high frequency band such as the FR2 band and THz band, more path loss may occur than in the FR1 band. FIG. 4 shows a change pattern of path loss (in decibel (dB)) according to a frequency change within a frequency range of about 0.06 THz to about 1 THz, which is measured under various conditions such as a communication distance d (e.g., 1 m or 10 m), line-of-sight (LOS), and multipath (MP).

Meanwhile, in a high frequency band, an extreme path loss may occur near a specific frequency. For example, in a high frequency band, an extreme path loss may occur near a specific frequency (e.g., about 0.55 THz, about 0.75 THz, etc.) due to a molecular absorption phenomenon.

Referring to Tables 2 to 4 and FIGS. 3 to 4, a bandwidth of each operating band in the FR2 band may be wider than a bandwidth of each operating band in the FR1 band. In the FR2 band, channel estimation may take a longer time than in the FR1 band. In the FR2 band, a path loss may be greater than in the FR1 band. In the FR2 band, a channel and path loss may vary at a high level over time. Communication in the FR2 band may be greatly affected by surrounding environments, such as communication distance or weather.

In order to flexibly utilize a wide frequency band, such as the FR2 frequency band or a frequency band combining the FR1 and FR2 frequency bands, according to a situation, a channel estimation procedure for the entire frequency band to be utilized may be required. The cell search scheme defined for communication in the FR1 band may not be efficient in a wide frequency band. Signal transmission and reception techniques may be required to quickly identify a channel condition in a wide or high frequency band and to allocate a frequency band appropriate for communication requirements. In addition, signal transmission and reception techniques may be required to respond to a rapid channel change in the high frequency band.

FIG. 5 is a sequence chart illustrating an exemplary embodiment of a frequency sensing method in a communication system.

As shown in FIG. 5, a communication system 500 may include a first communication node 501 and a second communication node 502. The communication system 500 may be the same as or similar to the communication system 100 described with reference to FIG. 1. The first communication node 501 may be the same as or similar to the base station 110-1, 110-2, 110-3, 120-1, or 120-2 described with reference to FIG. 1. The second communication node 502 may be the same as or similar to the terminal 130-1, 130-2, 130-3, 130-4, 130-5, or 130-6 described with reference to FIG. 1. The first communication node 501 and the second communication node 502 may be configured identically or similarly to the communication node 200 described with reference to FIG. 2. The first communication node 501 and the second communication node 502 may be identical or similar to the base station and UE described with reference to FIGS. 3 and 4. Alternatively, the first communication node 501 and the second communication node 502 may be terminals that perform sidelink (SL) communication with each other.

In an exemplary embodiment of the communication system 500, a frequency sensing operation may be performed according to a multi-stage frequency sensing scheme. Hereinafter, an exemplary embodiment of a frequency sensing method in the communication system will be described, taking as an example an exemplary embodiment of performing operations based on the multi-stage frequency band sensing scheme to improve frequency band sensing performance in the communication system using a wide frequency band. However, this is merely an example for convenience of description, and exemplary embodiments of the communication system are not limited thereto.

In an exemplary embodiment of the communication system 500, the first communication node 501 and the second communication node 502 may perform a multi-stage frequency sensing procedure. That is, the first communication node 501 and the second communication node 502 may perform a frequency sensing procedure including a plurality of stages. The multi-stage frequency sensing procedure may be configured in a hierarchical structure.

The first communication node 501 and the second communication node 502 may perform the multi-stage frequency sensing procedure based on mutual signal transmission and reception operations. Here, at least part of the signal transmission and reception operations for the multi-stage frequency sensing procedure may be performed on a Random Access Channel (RACH).

The multi-stage frequency sensing procedure may including a preparation stage and one or more sensing stages. In one or more sensing stages, the second communication node 502 may perform frequency band sensing based on a signal transmitted from the first communication node 501. Here, the entire frequency band in which sensing is performed (hereinafter referred to as 'sensing frequency band') may include a plurality of divided frequency bands. For each divided frequency band, a reference frequency ($F_{REF}$) may be set. For example, when a sensing frequency band in a specific sensing stage includes first to fourth divided frequency bands, the same or similar mapping relationship as in Table 7 may be established in the first to fourth divided frequency bands.

TABLE 7

| | Frequency (THz) | Divided frequency band (THz) | Index value |
|---|---|---|---|
| $F_{REF}$ #1 | A | A1~A2 | 0 |
| $F_{REF}$ #2 | B | B1~B2 | 1 |
| $F_{REF}$ #3 | C | C1~C2 | 2 |
| $F_{REF}$ #4 | D | D1~D2 | 3 |

Referring to Table 7, a sensing frequency band may include at least a first divided frequency band (i.e., band of A1 to A2 THz), a second divided frequency band (i.e., band of B1 to B2 THz), a third divided frequency band (i.e., band of C1 to C2 THz), and a fourth divided frequency band (i.e., band of D1 to D2 THz). Reference frequencies $F_{REF}$ #1 (e.g., A THz) to $F_{REF}$ #4 (e.g., D THz) respectively corresponding to the first to fourth divided frequency bands may be configured. For example, $F_{REF}$#1 to $F_{REF}$ #4 may be center frequencies of the first to fourth divided frequency bands, respectively. Index values therefor may be expressed as decimal values as shown in Table 7, or may be expressed as 4-bit values (i.e., 00, 01, 10, 11). A unit of the frequencies and the divided frequency bands may be THz. In Table 7, $A<B<C<D$ may be established. However, this is merely an example for convenience of description, and exemplary embodiments of the communication system are not limited thereto.

For example, in another exemplary embodiment of the communication system, a sensing frequency band may include K (K is a natural number greater than 1) divided frequency bands. In this case, reference frequencies $F_{REF}$ #1 to $F_{REF}$ #K respectively corresponding to the first to K-th divided frequency bands may be configured. The first to K-th divided frequency bands may be configured to have the same or different bandwidths. $F_{REF}$ #1 to $F_{REF}$ #K may be center frequencies of the first to K-th divided frequency bands, respectively. Alternatively, $F_{REF}$ #1 to $F_{REF}$ #K may be the maximum or minimum frequencies of the first to K-th divided frequency bands, respectively. Indexes of $F_{REF}$ #1 to $F_{REF}$ #K may be expressed as decimal or binary values. For example, in case of $2^{k-1}<K\leq 2^k$ (k is a natural number), each of the indexes of $F_{REF}$ #1 to $F_{REF}$ #K may be expressed as a binary value of k bits or more. In other words, in case of $k-1<\log_2 K\leq k$, each of the indexes of $F_{REF}$ #1 to $F_{REF}$#K may be expressed as a binary value of k bits or more.

A unit of the frequencies and divided frequency bands may be one of Hz, kHz, MHz, GHz, and THz. For each of one or more sensing stages, the same or similar information as Table 7 may be configured.

In each sensing stage, the first communication node 501 may transmit a sensing signal for a sensing operation in the sensing frequency band to the second communication node 502. Here, the sensing signal may be a synchronization signal block (SSB). However, this is merely an example for convenience of description, and exemplary embodiments of the frequency sensing method are not limited thereto.

The first communication node 501 may transmit the sensing signal at the preconfigured reference frequencies $F_{REF}$ #1 to $F_{REF}$ #K in the sensing frequency band. The second communication node 502 may perform frequency sensing or frequency band sensing based on the sensing signal transmitted from the first communication node 501. The second communication node 502 may perform sensing on the sensing signal at each of the reference frequencies $F_{REF}$ #1 to $F_{REF}$ #K. The second communication node 502 may generate a feedback signal based on a result of the sensing operation, and transmit the generated feedback signal to the first communication node 501. The first communication node 501 may receive the feedback signal. Based on the feedback signal, the first communication node 501 may determine that a divided frequency band (e.g., first divided frequency band) corresponding to one reference frequency (e.g., $F_{REF}$ #1) in the sensing frequency band is selected as a result of the sensing stage.

The multi-stage frequency sensing procedure may include sensing stages for frequency band sensing or frequency sensing once or N times (N is a natural number greater than 1). For example, the frequency sensing procedure according to an exemplary embodiment of the communication system 500 may include the following stages.

Preparation stage S505: The first communication node 501 may transmit prior information for the first to N-th stages to the second communication node 502. The second communication node 502 may receive the prior information transmitted from the first communication node 501. The prior information transmitted and received in the preparation stage S505 may include information to be used in each of the first to N-th sensing stages (S510 to S590). For example, the prior information transmitted and received in the preparation stage may include first prior information corresponding to the first sensing stage S510, n-th prior information corresponding to the n-th sensing stage S550, and N-th prior information corresponding to the N-th sensing stage S590. Each of the first to N-th prior information may include information on a division scheme of the sensing frequency band in each sensing stage, information on a reference frequency for each divided frequency band, and the like. Each of the first to N-th prior information may include at least some of the information shown in Table 7 for each sensing stage. The prior information may be transmitted to the second communication node 520 as being included in system information (e.g., MIB, etc.) transmitted from the first communication node 501.

Meanwhile, in another exemplary embodiment of the communication system 500, the preparation stage S505 may include first prior information for the first sensing stage S510. Thereafter, in each sensing stage (e.g. (n−1)-th sensing stage), the first communication node 501 may transmit the n-th prior information to be used in the next sensing stage (e.g., n-th sensing stage) to the second communication node 502.

On the other hand, in another exemplary embodiment of the communication system 500, the multi-stage frequency sensing procedure may not require the separate preparation stage S505. For example, in each sensing stage (e.g., n-th sensing stage), the first communication node 501 may configure a sensing signal (e.g. n-th sensing signal) transmitted to the second communication node 502 to include the corresponding prior information (e.g. n-th prior information).

Through the preparation stage S505, the first communication node 501 may trigger the multi-stage frequency sensing procedure or the first sensing stage S510. If the preparation stage S505 is not performed, the first communication node 501 may perform a separate operation to trigger the multi-stage frequency sensing procedure or the first sensing stage (S510).

First sensing stage S510: The first communication node 501 may trigger the first sensing stage S510. From the first prior information, the first communication node 501 may identify a set of a plurality of reference frequencies (hereinafter, first reference frequency set) included in a frequency band in which sensing is to be performed (hereinafter, first sensing frequency band) in the first sensing stage (S510). The first communication node 501 may transmit a first sensing signal for sensing in the first sensing stage S510 through the first reference frequency set (S511). The second communication node 502 may receive the first sensing signal transmitted from the first communication node 501 (S511).

The second communication node 502 may identify information on the first reference frequency set for the first sensing stage S510 from the first prior information. The second communication node 502 may perform sensing on the first sensing signal in the first reference frequency set (S513). In the step S513, the second communication node 502 may perform sensing on the first sensing signal at all reference frequencies included in the first reference frequency set. Alternatively, in the step S513, the second communication node 502 may perform sensing on the first sensing signal at some of all reference frequencies included in the first reference frequency set. For example, the second communication node 502 may receive the first sensing signal at all reference frequencies included in the first reference frequency set. The second communication node 502 may identify sensing result(s) (i.e., measurement result(s), reception quality(ies), etc.) for the first sensing signal only at some reference frequencies among all reference frequencies included in the first reference frequency set.

The second communication node 502 may generate a first feedback signal including a result of sensing on the first sensing signal in at least some of the first reference frequency set. The second communication node 502 may transmit the first feedback signal to the first communication node 501 (S515). The first communication node 501 may receive the first feedback signal from the second communication node 502 (S515). Based on the first feedback signal, the first communication node 501 may identify a first frequency band corresponding to a first frequency selected in the first sensing stage S510 (S517).

In an exemplary embodiment of the communication system, the first feedback signal may include measurement results on the first sensing signal at at least some of a plurality of reference frequencies included in the first reference frequency set. The first communication node 501 may select one reference frequency among a plurality of reference frequencies included in the first reference frequency set based on the measurement results included in the first feedback signal. For example, the first communication node 501 may identify a reference frequency (e.g., first frequency) corresponding to the best measurement result among the measurement results included in the first feedback signal. The first communication node 501 may identify a frequency band (i.e., first frequency band) corresponding to the first frequency from the first prior information. The first communication node 501 may determine that the first frequency band identified as described above corresponds to the result of selecting the frequency band in the first sensing stage S510.

In another exemplary embodiment of the communication system, the first feedback signal may include information related to one frequency (i.e., first frequency) selected by the second communication node 502 among the plurality of reference frequencies included in the first reference frequency set. For example, the second communication node 502 may select one reference frequency from the first reference frequency set based on the measurement results on the first sensing signal in the first reference frequency set. For example, the first communication node 501 may identify the reference frequency (i.e., first frequency) corresponding to the best measurement result among the measurement results for the first sensing signal. The second communication node 502 may transmit to the first communication node 501 at least some of information on the first frequency, measurement results for the first sensing signal at the first frequency, and information on the first frequency band corresponding to the first frequency through the first feedback signal. The first communication node 501 may identify information on the first frequency and/or the first frequency band through the first feedback signal. The first communication node 501 may determine that the first frequency band identified based on the first feedback signal corresponds to the result of selecting the frequency band in the first sensing stage S510.

n-th sensing stage S550: The first communication node 501 may trigger the n-th sensing stage S550 based on the (n−1)-th frequency band selected in the (n−1)-th sensing stage (not shown). The n-th sensing frequency band in which sensing is performed in the n-th sensing stage may be determined identically or similarly to the (n−1)-th frequency band selected in the (n−1)-th sensing stage. The first communication node 501 may identify information on the n-th frequency band selected based on a result of the operations in the n-th sensing stage S550. The first communication node 501 may determine that the n-th frequency band corresponds to the result of selecting the frequency band in the n-th sensing stage S550. Detailed operations constituting the n-th sensing stage S550 may be the same as or similar to the detailed operations constituting the first sensing stage S510. Here, the n-th sensing stage S550 may be performed only when n is greater than 2.

N-th sensing stage S590: The first communication node 501 may trigger the N-th sensing stage S590 based on the (N−1)-th frequency band selected in the (N−1)-th sensing stage (not shown). The N-th sensing frequency band in which sensing is to be performed in the N-th sensing stage may be determined to be the same as or similar to the (N−1)-th frequency band selected in the (N−1)-th sensing stage. Hereinafter, in describing the N-th sensing stage S590, content that is the same as or similar to those described with reference to the first sensing stage S510 and the n-th sensing stage S550 may be omitted.

The first communication node 501 may identify information on the N-th reference frequency set included in the N-th frequency band in which sensing is to be performed in the N-th sensing stage S590 from the N-th prior information. The first communication node 501 may transmit an N-th sensing signal for sensing in the Nth sensing stage S590 through an N-th reference frequency set (S591). The second communication node 502 may receive the N-th sensing signal transmitted from the first communication node 501 (S591). The second communication node 502 may identify information on the N-th reference frequency set for the N-th sensing stage S590 from the N-th prior information. The second communication node 502 may perform sensing for the N-th sensing signal in the N-th reference frequency set (S593). The second communication node 502 may generate an N-th feedback signal including a result of sensing for the N-th sensing signal in the N-th reference frequency set. The second communication node 502 may transmit the N-th feedback signal to the first communication node 501 (S595). The first communication node 501 may receive the N-th feedback signal from the second communication node 502 (S595). Based on the feedback signal, the first communication node 501 may identify information on an N-th frequency selected in the N-th sensing stage S590 or an N-th frequency band corresponding to the N-th frequency (S597).

The first communication node 501 may determine that the N-th frequency or N-th frequency band selected in the N-th sensing stage S590 corresponds to a final selection result in the multi-stage frequency sensing procedure. The first communication node 501 may perform resource allocation for the second communication node 502 based on the N-th frequency or N-th frequency band.

In an exemplary embodiment of the communication system, the second communication node 502 may perform sensing for a sensing signal at all or part of all reference frequencies included in the reference frequency set for each sensing stage. As the number of reference frequencies at which the second communication node 502 performs sensing for the sensing signal increases, the accuracy of the multi-stage frequency sensing procedure may be improved. On the other hand, as the number of reference frequencies at which the second communication node 502 performs sensing for the sensing signal decreases, the speed of the multi-stage frequency sensing procedure may be increased.

In an exemplary embodiment of the communication system, the number (e.g., N) of sensing stages constituting the multi-stage frequency sensing procedure may be determined statically or dynamically. The number of elements (e.g., K) of reference frequency sets in which sensing signals are transmitted in the sensing stages constituting the multi-stage frequency sensing procedure may be determined statically or dynamically. The number of elements (e.g., K) of reference frequency sets in which sensing signals are transmitted in the sensing stages constituting the multi-stage frequency sensing procedure may be determined to be the same or different. Accuracy and efficiency of the multi-stage frequency sensing procedure may vary according to the number of sensing stages (e.g., N) constituting the multi-stage frequency sensing procedure and the number of elements (e.g., K) of the reference frequency sets in which the sensing signals are transmitted in the sensing stages.

For example, the number of elements (e.g., K) of the reference frequency sets in which the sensing signals are transmitted for the respective sensing stages may be set based on a channel coherence bandwidth. For example, as a value of the channel coherence bandwidth is larger, the number K of elements of the reference frequency set may be determined to be a smaller value. On the other hand, as the value of the channel coherence bandwidth is smaller, the number K of elements of the reference frequency set may be determined to be a larger value. In other words, as the value of the channel coherence bandwidth is smaller, the number of reference frequencies at which the sensing signal is transmitted may increase.

FIG. 6 is a flowchart illustrating an exemplary embodiment of a resource allocation method in a communication system.

As shown in FIG. 6, a communication system may include a first communication node and a second communication node. The communication system may be the same as or similar to the communication system 500 described with reference to FIG. 5. The first communication node may be the same as or similar to the first communication node 501 described with reference to FIG. 5. The second communication node may be the same as or similar to the second communication node 502 described with reference to FIG. 5.

In an exemplary embodiment of the communication system, a resource allocation operation may be performed. Hereinafter, an exemplary embodiment of the resource allocation method in the communication system will be described, taking as an example an exemplary embodiment of performing operations for resource allocation based on frequency sensing results in the communication system using a wide frequency band. However, this is merely an example for convenience of description, and exemplary embodiments of the communication system are not limited thereto.

In an exemplary embodiment of the communication system, the first communication node and the second communication node may perform a multi-stage frequency sensing procedure. The multi-stage frequency sensing procedure may be performed identically or similarly to that described with reference to FIG. 5. The first communication node may perform resource allocation for the second communication node in a frequency band selected as a result of the multi-stage frequency sensing procedure. When performing resource allocation for the second communication node, the first communication node may configure resource allocation information based on predetermined information on the second communication node, as in the operations shown in FIG. 6.

In an exemplary embodiment of the communication system, the first communication node may identify first information on the second communication node (S601). The first communication node may configure first resource allocation information based on the first information on the second communication node (S603). The first communication node may perform resource allocation for the second communication node based on the first resource allocation information. Alternatively, the first communication node may transmit the configured first resource allocation information to the second communication node (S605). Specific configurations related to the first information and first resource allocation information may be determined based on one of the following Schemes #1 to #5.

Scheme #1: The first information may be a Doppler shift (DS) value for the second communication node, and the first resource allocation information may include a width of a frequency band allocated to the second communication node.

In an exemplary embodiment of the communication system, when a mobility of the terminal is high, such as when the terminal moves at high speed, a large DS may occur, and the larger the DS, the higher a probability of interference between subcarriers constituting an OFDM signal. In addition, the higher the mobility of the terminal, the shorter a time it takes for a channel to change beyond a certain level (i.e., channel coherence time). For communication that is robust to interference between subcarriers and a channel change, the larger the DS value for a certain terminal, the larger the SCS value may need to be set. The larger the DS value for a terminal, the wider the frequency band may need to be allocated to support the large SCS value.

The first communication node may determine a width of a frequency band allocated to the second communication node based on the DS value identified for the second communication node. For example, the first communication node may determine the DS value for the second communication node and the width of the frequency band allocated to the second communication node based on a preconfigured first mapping relationship as shown in Table 8.

TABLE 8

| DS value | Width of frequency band |
|---|---|
| DS #1 | BW #1 |
| DS #2 | BW #2 |
| DS #3 | BW #3 |
| DS #4 | BW #4 |

Referring to Table 8, the first mapping relationship may be established between a plurality of DS values (i.e., DS #1 to DS #4) and a plurality of frequency bandwidth values (i.e., BW #1 to BW #4). Table 8 shows the first mapping relationship for four DS values, but this is merely an example for convenience of description and exemplary embodiments of the communication system are not limited thereto. For example, the first mapping relationship may be established between L (L is a natural number) DS values (i.e., DS #1 to DS #L) and L frequency bandwidth values (i.e., BW #1 to BW #L). The frequency bandwidth values may be expressed in units such as MHz or GHz. In the first mapping relationship, as DS values increase, the sizes of frequency bandwidth values may also increase. In other words, the higher the mobility of the second communication node, the wider the frequency band may be allocated to the second communication node.

The first communication node may determine an appropriate frequency bandwidth for the second communication node based on the DS value identified for the second communication node and the first mapping relationship that is the same as or similar to Table 8. For example, the first communication node may identify a value (e.g., DS #2) closest to the DS value identified for the second communication node in the first mapping relationship. The first communication node may identify a frequency bandwidth (e.g., BW #2) corresponding to the identified DS value (DS #2). Through this, the value of the width of the frequency band allocated to the second communication node may be determined. The first communication node may perform resource allocation for the second communication node based on the determined frequency bandwidth (i.e., BW #2). Alternatively, the first communication node may transmit the determined frequency bandwidth (i.e., BW #2) to the second communication node. For example, the first communication node may transmit the determined frequency bandwidth value to the second communication node based on a parameter locationAndBandwidth in a resource indicator value (RIV) in a downlink control information (DCI)-format.

Scheme #2: The first information may be a DS value for the second communication node, and the first resource allocation information may include a reference allocation frequency that serves as a reference for a frequency band allocated to the second communication node.

The first communication node may determine a reference allocation frequency corresponding to a frequency band allocated to the second communication node, based on the DS value identified for the second communication node. For example, the first communication node may determine the DS value for the second communication node and the reference allocation frequency corresponding to the frequency band allocated to the second communication node, based on a preconfigured second mapping relationship as shown in Table 9.

TABLE 9

| DS value | Reference allocation frequency |
|---|---|
| DS #1 | $F_{ALL}$ #1 |
| DS #2 | $F_{ALL}$ #2 |
| DS #3 | $F_{ALL}$ #3 |
| DS #4 | $F_{ALL}$ #4 |

Referring to Table 9, the second mapping relationship may be established between four DS values (i.e., DS #1 to DS #4) and four reference allocation frequency values (i.e., $F_{ALL}$ #1 to $F_{ALL}$ #4). Alternatively, the second mapping relationship may be established between L DS values (i.e., DS #1 to DS #L) and L reference allocation frequency values (i.e., $F_{ALL}$ #1 to $F_{ALL}$ #L). The reference allocation frequency values may respectively mean center frequencies, maximum frequencies, minimum frequencies, etc. of frequency bands allocated to the second communication node. The reference allocation frequency values may be determined to be the same as or similar to the reference frequencies (i.e., $F_{REF}$ #1 to $F_{REF}$ #K) in one of the sensing stages constituting the multi-stage frequency sensing procedure described with reference to FIG. 5. The reference allocation frequency values may be determined to be the same as or similar to the reference frequencies (i.e., $F_{REF}$ #1 to $F_{REF}$ #K) in one of the sensing stages constituting the multi-stage frequency sensing procedure described with reference to FIG. 5. The reference allocation frequency values may be expressed in units such as MHz, GHz, and THz. In the second mapping relationship, as the DS values increase, reference allocation frequency values may also increase. In other words, the higher the mobility of the second communication node, the higher the frequency band may be allocated to the second communication node.

The first communication node may determine an appropriate frequency bandwidth for the second communication node based on the DS value identified for the second communication node and the second mapping relationship that is the same or similar to Table 9. For example, the first communication node may identify a DS value (e.g., DS #2) closest to the DS value identified for the second communication node in the second mapping relationship. The first communication node may identify a reference allocation frequency value (e.g., $F_{ALL}$ #2) corresponding to the identified DS value (i.e., DS #2). Through this, the reference value ($F_{ALL}$ #2) for a location of the frequency band allocated to the second communication node may be determined.

The first communication node may perform resource allocation for the second communication node based on the determined reference allocation frequency value (i.e., $F_{ALL}$ #2). Alternatively, the first communication node may transmit the determined reference allocation frequency value ($F_{ALL}$ #2) to the second communication node. For example, the first communication node may transmit the determined reference allocation frequency value to the second communication node based on a parameter offsetToCarrier transmitted through system information (e.g., SIB1. etc.) or radio resource control (RRC) signaling, a parameter locationAndBandwidth in an RIV of a DCI format, and/or the like.

Scheme #3: The first information may be a latency requirement (LR) value for the second communication node, and the first resource allocation information may include a width of a frequency band allocated to the second communication node.

In an exemplary embodiment of the communication system, as a LR value for a certain terminal is smaller (i.e., when a shorter latency is required), a signal with a shorter symbol duration may need to be transmitted and received for the terminal. To shorten the symbol duration, a large SCS value may need to be set. The larger the LR value for a certain terminal, the wider the frequency band may need to be allocated to support the large SCS value.

The first communication node may determine the width of the frequency band allocated to the second communication node based on the LR value identified for the second communication node. For example, the first communication node may determine the LR value for the second communication node and the width of the frequency band allocated to the second communication node based on a preconfigured third mapping relationship as shown in Table 10.

TABLE 10

| LR value | Width of frequency band |
|---|---|
| LR #1 | BW #1 |
| LR #2 | BW #2 |
| LR #3 | BW #3 |
| LR #4 | BW #4 |

Referring to Table 10, the third mapping relationship may be established between four LR values (i.e., LR #1 to LR #4) and four frequency bandwidth values (i.e., BW #1 to BW #4). Alternatively, the third mapping relationship may be established between L LR values (i.e., LR #1 to LR #L) and L frequency bandwidth values (i.e., BW #1 to BW #L). The frequency bandwidth values may be expressed in units such as MHz or GHz. In the third mapping relationship, as the LR values increase, the size of frequency bandwidth values may also increase. In other words, the shorter a latency time required for the second communication node, the wider the frequency band may be allocated to the second communication node.

The first communication node may determine an appropriate frequency bandwidth for the second communication node based on the LR value identified for the second communication node and the third mapping relationship that is the same or similar to Table 10. For example, the first communication node may identify a LR value (e.g., LR #2) closest to the LR value identified for the second communication node in the third mapping relationship. The first communication node may identify a frequency bandwidth value (e.g., BW #2) corresponding to the identified LR value (LR #2). Through this, the value of the width of the frequency band allocated to the second communication node may be determined. The first communication node may perform resource allocation for the second communication node based on the determined frequency bandwidth value (BW #2). Alternatively, the first communication node may transmit the determined frequency bandwidth value (BW #2) to the second communication node. For example, the first communication node may transmit the determined frequency bandwidth value to the second communication node based on a parameter locationAndBandwidth in an RIV of a DCI format.

Scheme #4: The first information may be an LR value for the second communication node, and the first resource allocation information may include a reference allocation frequency that serves as a reference for a frequency band allocated to the second communication node.

The first communication node may determine a reference allocation frequency corresponding to a frequency band allocated to the second communication node, based on the LR value identified for the second communication node. For example, the first communication node may determine the LR value for the second communication node and the reference allocation frequency corresponding to the frequency band allocated to the second communication node based on a preconfigured fourth mapping relationship as shown in Table 11.

TABLE 11

| LR value | Reference allocation frequency |
|---|---|
| LR #1 | $F_{ALL}$ #1 |
| LR #2 | $F_{ALL}$ #2 |
| LR #3 | $F_{ALL}$ #3 |
| LR #4 | $F_{ALL}$ #4 |

Referring to Table 11, the fourth mapping relationship may be established between four LR values (LR #1 to LR #4) and four reference allocation frequency values ($F_{ALL}$ #1 to $F_{ALL}$ #4). Alternatively, the fourth mapping relationship may be established between L LR values (LR #1 to LR #L) and L reference allocation frequency values ($F_{ALL}$ #1 to $F_{ALL}$ #L). The reference allocation frequency values may respectively mean center frequencies, maximum frequencies, minimum frequencies or the like of the frequency bands allocated to the second communication node. The reference allocation frequency values may be determined to be the same as or similar to the reference frequencies ($F_{REF}$ #1 to $F_{REF}$ #K) in one of the sensing stages constituting the multi-stage frequency sensing procedure described with reference to FIG. 5. The reference allocation frequency values may be expressed in units such as MHz, GHz, and THz. In the fourth mapping relationship, as LR values increase, reference allocation frequency values may also increase. In other words, the shorter a latency required for the second communication node, the higher the frequency band may be allocated to the second communication node.

The first communication node may determine an appropriate frequency bandwidth for the second communication node based on the LR value identified for the second communication node and the fourth mapping relationship that is the same as or similar to Table 11. For example, the first communication node may identify an LR value (e.g., LR #2) closest to the LR value identified for the second communication node in the fourth mapping relationship. The first communication node may identify the reference allocation frequency value (e.g., $F_{ALL}$ #2) corresponding to the identified LR value (LR #2). Through this, a reference value ($F_{ALL}$ #2) for a location of the frequency band allocated to the second communication node may be determined. The first communication node may perform resource allocation for the second communication node based on the determined reference allocation frequency value ($F_{ALL}$ #2). Alternatively, the first communication node may transmit the determined reference allocation frequency value ($F_{ALL}$ #2) to the second communication node. For example, the first communication node may transmit the determined reference allocation frequency value to the second communication node based on a parameter offsetToCarrier transmitted through system information (e.g., SIB1, etc.) or RRC signaling, a parameter locationAndBandwidth in an RIV of a DCI format, and/or the like.

Scheme #5: The first information may be a maximum power (MP) value of the second communication node, and the first resource allocation information may include a reference allocation frequency that serves as a reference for a frequency band allocated to the second communication node.

In an exemplary embodiment of the communication system, when a MP value for a certain terminal is small (i.e., the amount of power used by the terminal is small), a frequency band for which a high reference signal received power (RSRP) is to be measured may need to be configured for the terminal to prevent a decline in quality of service (QoS). The smaller the MP value for a terminal, the higher the frequency band may need to be allocated to satisfy QoS.

The first communication node may determine a width of a frequency band allocated to the second communication node based on the MP value identified for the second communication node. For example, the first communication node may determine the MP value for the second communication node and a reference allocation frequency corresponding to the frequency band allocated to the second communication node based on a preconfigured fifth mapping relationship as shown in Table 12.

TABLE 12

| MP value | Reference allocation frequency |
|---|---|
| MP #1 | $F_{ALL}$ #1 |
| MP #2 | $F_{ALL}$ #2 |
| MP #3 | $F_{ALL}$ #3 |
| MP #4 | $F_{ALL}$ #4 |

Referring to Table 12, the fifth mapping relationship may be established between four MP values (MP #1 to MP #4) and four reference allocation frequency values ($F_{ALL}$ #1 to $F_{ALL}$ #4). Alternatively, the fifth mapping relationship may be established between L MP values (MP #1 to MP #L) and L reference allocation frequency values ($F_{ALL}$ #1 to $F_{ALL}$ #L). The reference allocation frequency values may respectively mean center frequencies, maximum frequencies, minimum frequencies, or the like of the frequency bands allocated to the second communication node. The reference allocation frequency values may be determined to be the same as or similar to the reference frequencies ($F_{REF}$ #1 to $F_{REF}$ #K) in one of the sensing stages constituting the multi-stage frequency sensing procedure described with reference to FIG. 5. The reference allocation frequency values may be expressed in units such as MHz, GHz, and THz. In the fifth mapping relationship, as MP values decrease, a reference frequency with a better measurement result (e.g., RSRP) for the sensing signal (e.g., SSB, etc.) may be determined. In other words, as the maximum power of the second communication node is smaller, a frequency band with a better sensing signal measurement result may be allocated to the second communication node.

The first communication node may determine an appropriate frequency bandwidth for the second communication node based on the MP value identified for the second communication node and the fifth mapping relationship that is the same or similar to Table 12. For example, the first communication node may identify an MP value (e.g., MP #2) closest to the MP value identified for the second communication node in the fifth mapping relationship. The first communication node may identify a reference allocation frequency value (e.g., $F_{ALL}$ #2) corresponding to the identified MP value (e.g., MP #2). Through this, a reference value (i.e., $F_{ALL}$ #2) for the location of the frequency band allocated to the second communication node may be determined. The first communication node may perform resource allocation for the second communication node based on the determined reference allocation frequency value (i.e., $F_{ALL}$ #2). Alternatively, the first communication node may transmit the determined reference allocation frequency value ($F_A$IL #2) to the second communication node. For example, the first communication node may transmit the determined reference allocation frequency value to the second communication node based on a parameter locationAndBandwidth in an RIV of a DCI format.

Schemes #1 to #5 described with reference to FIG. 6 may be applied alone, or a combination of two or more thereof may be applied. For example, when combining Scheme #1 and Scheme #2, the first communication node may determine frequency-domain allocation information (i.e., location and width of a frequency band) for the second communication node based on the DS value identified for the second communication and the first and second mapping relationships. On the other hand, when combining Scheme #3 and Scheme #5, the first communication node may determine a width of the frequency band allocated to the second communication node based on the LR value identified for the second communication node and the third mapping relationship, and may determine the location of the frequency band allocated to the second communication node based on the MP value of the second communication node and the fifth mapping relationship.

FIG. 7 is a flowchart illustrating an exemplary embodiment of a method for determining whether to reallocate resources in a communication system.

As shown in FIG. 7, a communication system may include a first communication node and a second communication node. The communication system may be the same as or similar to the communication system 500 described with reference to FIG. 5 and/or the communication system described with reference to FIG. 6. The first communication node may be the same as or similar to the first communication node 501 described with reference to FIG. 5 and/or the first communication node described with reference to FIG. 6. The second communication node may be the same as or similar to the second communication node 502 described with reference to FIG. 5 and/or the second communication node described with reference to FIG. 6.

In an exemplary embodiment of the communication system, an operation of determining whether to reallocate resources may be performed. Hereinafter, an exemplary embodiment of the resource allocation method in the communication system will be described, taking as an example an exemplary embodiment of performing operations for resource allocation based on frequency sensing results in the communication system using a wide frequency band. However, this is merely an example for convenience of description, and exemplary embodiments of the communication system are not limited thereto.

In an exemplary embodiment of the communication system, the first communication node and the second communication node may perform a multi-stage frequency sensing procedure. The multi-stage frequency sensing procedure may be performed identically or similarly to that described with reference to FIG. 5. The first communication node may perform resource allocation for the second communication node in a frequency band selected as a result of the multi-stage frequency sensing procedure. The resource allocation operation for the second communication node may be performed identically or similarly to that described with reference to FIG. 6. The second communication node may determine whether to reallocate resources based on measurement results for the allocated resources. Here, the second communication node may determine whether to reallocate resources based on one or more thresholds set by the first communication node and/or the second communication node, as in operations shown in FIG. 7.

The second communication node may receive a signal including information on a first threshold from the first communication node (S710). Here, the first threshold may correspond to a threshold for evaluating communication performance set by the first communication node. For example, the first communication node may correspond to a base station, and the first threshold may correspond to a threshold set by the first communication node to improve a throughput within a first cell formed by the first communication node. The first threshold may be defined as an RSRP value or a type of CSI-RSRP value. The first threshold may be set identically or differently for each cell. The first threshold may be set identically or differently for each terminal in each cell. The first threshold may be set identically or differently for each resource allocated to each terminal.

The information on the first threshold may include a first threshold indicator corresponding to the first threshold set by the first communication node. The information on the first threshold transmitted from the first communication node to the second communication node may be configured identically or similarly to Table 13.

TABLE 13

| Field | Delivery scheme | Number of bits | Description |
|---|---|---|---|
| Threshold indicator | PDCCH/RRC | $N_{TH}$ bits | 0 bits if no threshold |

Referring to Table 13, the information on the first threshold, which includes the threshold indicator, may be transmitted from the first communication node to the second communication node through a DCI format on a physical downlink control channel (PDCCH) or through RRC signaling. The first communication node may map a plurality of threshold indicators to a plurality of sections divided according to a size of an L1 CSI-RSRP measured quality value. The first communication node may transmit a first threshold indicator corresponding to the first threshold among the threshold indicators mapped for the plurality of sections to the second communication node. The second communication node may receive the first threshold indicator from the first communication node in a state in which information on the mapping relationship between the plurality of sections and the threshold indicators is pre-shared by the first communication node, thereby determining the first threshold. A value of $N_{TH}$ may be determined based on the pre-shared mapping relationship described above. The value of $N_{TH}$ may be determined statically or dynamically. Alternatively, the value of $N_{TH}$ may be interpreted as a value corresponding to a section identical or similar to a section of a reported value of CSI-RSRP, which is defined in the technical specifications. $N_{TH}$ may be a natural number greater than or equal to 1.

Meanwhile, if there is no threshold reference required by the first communication node for the second communication node (or terminals in a cell formed by the first communication node), zero bit may be assigned to the threshold indicator or threshold indicator field. In this case, the second communication node may perform the operations for determining whether to reallocate resources shown in FIG. 7 regardless of the first threshold.

Meanwhile, the second communication node may identify the information on the second threshold (S720). Here, the second threshold may correspond to a threshold for evaluating communication performance set by the second communication node. For example, the first communication node and the second communication node may respectively correspond to a base station and a terminal, and the second threshold may correspond to a threshold set to guarantee the minimum QoS or achieve a target QoS within a cell to which the second communication node is connected. The second threshold may be defined as an RSRP value or a type of CSI-RSRP value. The second threshold may be set identically or differently for each cell connected to the second communication node. The second threshold may be set identically or differently for each base station connected to the second communication node. The second threshold may be set identically or differently for each resource allocated to the second communication node. On the other hand, if there is no threshold reference set by the second communication node itself, the second communication node may perform the operations for determining whether to reallocate resources shown in FIG. 7 regardless of the second threshold.

The second communication node may measure an RSRP value in the resource allocated by the first communication node (S720). The second communication node may compare the RSRP value measured in the step S720 with the first threshold and/or the second threshold (S725). The second communication node may determine whether the resource allocated by the first communication node can be used based on a result of the comparison in the step S725. In other words, the second communication node may determine whether a resource reallocation procedure is required or whether a new frequency sensing procedure is required based on the result of the comparison in the step S725.

If the measured RSRP is greater than or equal to the first threshold and/or the second threshold, the second communication node may determine that the allocated resource can be used for communication with the first communication node (S730). In this case, the second communication node may transmit a first indicator to the first communication node (S735). Here, the first indicator may be referred to as a 'resource availability indicator'. The first indicator may indicate that the resource allocated by the first communication node to the second communication node can be used. In other words, the first indicator may indicate that a resource reallocation procedure (or a new frequency sensing procedure) is not required. In this case, the first communication node and the second communication node may communicate with each other through the allocated resource.

On the other hand, if the measured RSRP is less than the first threshold and/or the second threshold, the second communication node may determine that the allocated resource cannot be used for communication with the first communication node (S740). If the measured RSRP is less than the first threshold and/or the second threshold, the second communication node may determine that reallocation of a resource is required (S740). In this case, the second communication node may transmit a second indicator to the first communication node (S745). Here, the second indicator may be referred to as a 'resource reallocation indicator'. The second indicator may indicate that the resource allocated by the first communication node to the second communication node cannot be used. In other words, the second indicator may indicate that a resource reallocation procedure (or a new frequency sensing procedure) is required. In this case, the first communication node and the second communication node perform again operations (e.g., steps S505 to S597) constituting the multi-stage frequency sensing procedure described with reference to FIG. 5 or operations (e.g., steps S601 to S605) constituting the resource allocation procedure described with reference to FIG. 6.

The first indicator transmitted in the step S735 and the second indicator transmitted in the step S745 may be collectively referred to as 'sensing indicator'. In an exemplary embodiment of the communication system, the sensing indicator may be configured identically or similarly to Table 14.

TABLE 14

| Sensing indicator | Sensing indicator information |
|---|---|
| 0 | New frequency sensing operation is not required |
| 1 | New frequency sensing operation is required |

Table 14 is merely an example for convenience of description, and exemplary embodiments of the communication system are not limited thereto. For example, in another exemplary embodiment of the communication system, when the value of the sensing indicator is 1, it may mean that a new frequency sensing procedure (or frequency reallocation procedure) is required, and when the value of the sensing indicator is 0, it may mean that a new frequency sensing procedure (or frequency reallocation procedures) is not required.

The sensing indicator configured as shown in Table 14 may be transmitted during a CSI reporting procedure. Specifically, the second communication node may transmit a first report signal to the first communication node to report CSI such as a Channel Quality Indicator (CQI), Precoding Matrix Index (PMI), and Rank Indicator (RI) to the first communication node. Here, the first report signal may include information on the sensing indicator configured as shown in Table 14.

FIG. 8 is a flowchart illustrating an exemplary embodiment of a signal transmission and reception method in a communication system.

As shown in FIG. 8, a communication system may include a first communication node and a second communication node. The communication system may be the same as or similar to the communication system 500 described with reference to FIG. 5 and/or the communication system described with reference to FIG. 6. The first communication node may be the same as or similar to the first communication node 501 described with reference to FIG. 5, the first communication node described with reference to FIG. 6, and/or the first communication node described with reference to FIG. 7. The second communication node may be the same as or similar to the second communication node 502 described with reference to FIG. 5, the second communication node described with reference to FIG. 6, and/or the second communication node described with reference to FIG. 7. Hereinafter, in describing an exemplary embodiment of a method for transmitting and receiving signals in a communication system with reference to FIG. 8, content that overlaps with those described with reference to FIGS. 1 to 7 may be omitted.

In an exemplary embodiment of the communication system, the first communication node and the second communication node may perform a frequency band estimation procedure through multi-stage frequency sensing (S810). The first communication node and the second communication node may estimate or determine one or more frequency bands (hereinafter, N-th frequency band) in which a resource allocation procedure for the second communication node is to be performed based on the same or similar procedure as the multi-stage frequency sensing procedure described with reference to FIG. 5.

The first communication node and the second communication node may perform a resource allocation procedure in the N-th frequency band (S820). The second communication node may transmit first information on the second communication node to the first communication node in the N-th frequency band. Here, the first information on the second communication node may include at least one of information on a Doppler shift (DS) corresponding to mobility of the second communication node, information on a latency requirement (LR) for the second communication node, or information on a maximum power of the second communication node. The first communication node may perform resource allocation for the second communication node based on the first information on the second communication node. The operations according to the step S820 may be the same or similar to the operations according to the exemplary embodiment of the resource allocation method described with reference to FIG. 6.

The first communication node and the second communication node may perform a procedure for transmitting and receiving a sensing indicator indicating whether a resource reallocation procedure (or new frequency sensing procedure) is required for the second communication node based on the resource allocation result for the second communication node (S830). The second communication node may determine whether resource reallocation (or new frequency sensing procedure) for the second communication node is required by comparing the measurement result on the resource allocated in the step S820 and the first threshold determined by the first communication node and/or second threshold determined by the second communication node. The second communication node may transmit a sensing indicator indicating the determination result to the first communication node. The first communication node may determine whether a resource reallocation procedure (or new frequency sensing procedure) is required based on the sensing indicator transmitted from the second communication node. The operations according to the step S830 may be the same as or similar to the operations according to the exemplary embodiment of the method for determining whether to reallocate resources described with reference to FIG. 7.

According to the method and apparatus for transmitting and receiving signals in the communication system, communication nodes such as a base station and a terminal can quickly and efficiently estimate a frequency appropriate for mutual communication within an available frequency band based on the multi-stage frequency sensing procedure. The communication nodes such as a base station and a terminal can perform the resource allocation procedure based on specific information identified with respect to the terminal, etc., within a frequency band determined based on the multi-stage frequency sensing procedure. This can improve communication performance in a high frequency band such as an FR2 band and terahertz band.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

The invention claimed is:

1. An operation method of a first communication node in a communication system, comprising:

triggering a first sensing procedure in a first sensing frequency band;

transmitting to a second communication node a first sensing signal at a plurality of reference frequencies included in a first reference frequency set configured within the first sensing frequency band;

receiving, from the second communication node receiving the first sensing signal, a first feedback signal generated based on a result of receiving the first sensing signal;

identifying information on a first frequency band selected from among a plurality of divided frequency bands included in the first sensing frequency band, based on the first feedback signal; and triggering a second sensing procedure in a second sensing frequency band determined based on the identified first frequency band, wherein the plurality of reference frequencies included in the first reference frequency set correspond to the plurality of divided frequency bands included in the first sensing frequency band, respectively.

2. The operation method according to claim 1, wherein the triggering of the first sensing procedure comprises: transmitting first prior information to be used in the first sensing procedure to the second communication node, and the first prior information includes at least part of information on the plurality of divided frequency bands included in the first sensing frequency band or information on the plurality of reference frequencies included in the first reference frequency set.

3. The operation method according to claim 1, wherein the identifying of the information on the first frequency band comprises:

identifying measurement results included in the first feedback signal and measured by the second communication node with respect to the first sensing signal within at least part of the plurality of reference frequencies included in the first reference frequency set;

identifying a first frequency corresponding to a best measurement result among the measurement results for the first sensing signal; and identifying the first frequency band corresponding to the first frequency.

4. The operation method according to claim 1, wherein the identifying of the information on the first frequency band comprises:

identifying information on a first frequency selected by the second communication node from among the plurality of reference frequencies included in the first reference frequency set based on a result of receiving the first sensing signal, which is included in the first feedback signal; and identifying the first frequency band corresponding to the first frequency.

5. The operation method according to claim 1, further comprising: after triggering the second sensing procedure, identifying first information on the second communication node in a second frequency band selected based on the second sensing procedure;

configuring first resource allocation information for the second communication node based on the first information on the second communication node; and transmitting the first resource allocation information to the second communication node.

6. The operation method according to claim 5, wherein the first information includes at least one of information on a Doppler shift (DS) for the second communication node, information on a latency requirement (LR) for the second communication node, or information on a maximum power of the second communication node, and the first resource allocation information includes at least one of information on a size of a frequency band allocated to the second communication node within the second frequency band, or information on a reference allocation frequency corresponding to a location of the allocated frequency band.

7. The operation method according to claim 5, further comprising:

after transmitting the first resource allocation information to the second communication node, receiving a sensing indicator configured based on the first resource allocation information; and determining whether an additional sensing procedure is required for the second communication node, based on the received sensing indicator.

8. The operation method according to claim 7, wherein the receiving of the sensing indicator comprises:

receiving a Channel State Information (CSI) report signal transmitted from the second communication node to the first communication node; and identifying information on the sensing indicator included in the CSI report signal, wherein the sensing indicator is determined based on a result of comparing first reception strength information measured by the second communication node in an allocated resource indicated by the first resource allocation information with at least one of a first threshold transmitted from the first communication node to the second communication node or a second threshold set by the second communication node.

9. An operation method of a first communication node in a communication system, comprising:

performing a frequency band sensing procedure including one or more sensing procedures through signal transmission and reception with a second communication node within a first sensing frequency band;

identifying information on one or more divided frequency bands selected as a result of the frequency band sensing procedure;

identifying first information on the second communication node in the selected one or more divided frequency bands;

configuring first resource allocation information, which is resource allocation information for the second communication node in the selected one or more divided frequency bands, based on the first information on the second communication node; and transmitting the first resource allocation information to the second communication node.

10. The operation method according to claim 9, wherein the first information includes at least one of information on a Doppler shift (DS) for the second communication node, information on a latency requirement (LR) for the second communication node, or information on a maximum power of the second communication node, and the first resource allocation information includes at least one of information on a size of a frequency band allocated to the second communication node within the second frequency band, or information on a reference allocation frequency corresponding to a location of the allocated frequency band.

11. The operation method according to claim 9, wherein the performing of the frequency band sensing procedure comprises:

triggering a first sensing procedure in a first sensing frequency band;

transmitting a first sensing signal at a plurality of reference frequencies included in a first reference frequency set configured within the first sensing frequency band;

receiving, from the second communication node receiving the first sensing signal, a first feedback signal generated based on a result of receiving the first sensing signal;

identifying information on a first frequency band selected from among a plurality of divided frequency bands included in the first sensing frequency band, based on the first feedback signal;

triggering a second sensing procedure in a second sensing frequency band determined based on the identified first frequency band; and selecting the one or more divided frequency bands as a result of the second sensing procedure, wherein the plurality of reference frequencies included in the first reference frequency set correspond to the plurality of divided frequency bands included in the first sensing frequency band, respectively.

12. The operation method according to claim 9, wherein the identifying of the first information on the second communication node comprises:

transmitting a first request signal to the second communication node in the selected one or more divided frequency bands;

receiving, from the second communication node, a first response signal transmitted as a response to the first request signal in the selected one or more divided frequency bands; and identifying the first information included in the first response signal.

13. The operation method according to claim 9, further comprising:

after transmitting the first resource allocation information to the second communication node, receiving a sensing indicator configured based on the first resource allocation information; and determining whether an additional sensing procedure is required for the second communication node, based on the received sensing indicator, wherein the sensing indicator is determined based on a result of comparing first reception strength information measured by the second communication node in an allocated resource indicated by the first resource allocation information with at least one of a first threshold transmitted from the first communication node to the second communication node or a second threshold set by the second communication node.

14. A first communication node in a communication system, the first communication node comprising a processor, wherein the processor is configured to perform:

receiving a first sensing signal from a second communication node within at least part of a plurality of reference frequencies included in a first reference frequency set configured for a first sensing procedure within a first sensing frequency band;

generating a first feedback signal based on a result of receiving the first sensing signal;

transmitting the first feedback signal to the second communication node transmitting the first sensing signal; and receiving a second sensing signal within at least part of a plurality of reference frequencies included in a second reference frequency set configured for a second sensing procedure within a second frequency band determined based on a first frequency band selected through the first sensing procedure, wherein the plurality of reference frequencies included in the first reference frequency set correspond to a plurality of divided frequency bands included in the first sensing frequency band, respectively, and the first sensing frequency band is selected based on the first feedback signal from among the plurality of divided frequency bands included in the first sensing frequency band.

15. The first communication node according to claim 14, wherein the processor is further configured to perform: before receiving the first sensing signal, receiving from the second communication node first prior information to be used in the first sensing procedure, and the first prior information includes at least part of information on the plurality of divided frequency bands included in the first sensing frequency band or information on the plurality of reference frequencies included in the first reference frequency set.

16. The first communication node according to claim 14, wherein in the generating of the first feedback signal, the processor is further configured to perform:

identifying measurement results measured by the first communication node with respect to the first sensing signal within at least part of the plurality of reference frequencies included in the first reference frequency set; and generating the first feedback signal including the measurement results measured with respect to the first sensing signal.

17. The first communication node according to claim 14, wherein in the generating of the first feedback signal, the processor is further configured to perform:

identifying measurement results measured by the first communication node with respect to the first sensing signal within at least part of the plurality of reference frequencies included in the first reference frequency set;

identifying a first frequency corresponding to a best measurement result among the measurement results for the first sensing signal; and generating the first feedback signal based on information on the first frequency.

18. The first communication node according to claim 14, wherein the processor is further configured to perform:

after receiving the second sensing signal, transmitting first information on the first communication node to the second communication node in a second frequency band selected based on the second sensing procedure; and receiving first resource allocation information configured based on the first information from the second communication node.

19. The first communication node according to claim 18, wherein the processor is further configured to perform:

after receiving the first resource allocation information, measuring first reception strength information in an allocated resource indicated by the first resource allocation information;

configuring a sensing indicator based on a result of comparing the measured first reception strength information with at least one of a first threshold transmitted from the first communication node to the second communication node and a second threshold information set by the second communication node; and transmitting the sensing indicator to the second communication node.

20. The first communication node according to claim 19, wherein the sensing indicator is transmitted as being included in a Channel State Information (CSI) report signal transmitted from the first communication node to the second communication node.

* * * * *